United States Patent [19]

Lindsay et al.

[11] Patent Number: 5,542,089
[45] Date of Patent: Jul. 30, 1996

[54] METHOD AND APPARATUS FOR ESTIMATING THE NUMBER OF OCCURRENCES OF FREQUENT VALUES IN A DATA SET

[75] Inventors: Bruce G. Lindsay; Eugene J. Shekita, both of San Jose, Calif.

[73] Assignee: International Business Machines Corporation, Armonk, N.Y.

[21] Appl. No.: 280,623

[22] Filed: Jul. 26, 1994

[51] Int. Cl.$^6$ .............................. G06F 17/30; G06F 12/00
[52] U.S. Cl. ........................ 395/600; 364/962; 364/963; 364/974.6; 364/DIG. 2; 395/700
[58] Field of Search ..................................... 395/425, 575, 395/600, 650, 800; 364/419.13, 419.19; 370/85.13, 92, 96.1

[56] References Cited

U.S. PATENT DOCUMENTS

| 4,290,105 | 9/1981 | Chichelli et al. | 395/600 |
| 4,736,287 | 4/1988 | Druke et al. | 395/455 |
| 4,956,774 | 9/1990 | Shibamiya et al. | 395/600 |
| 4,961,139 | 10/1990 | Hong et al. | 395/600 |
| 5,032,987 | 7/1991 | Broder et al. | 395/600 |
| 5,043,885 | 8/1991 | Robinson | 395/460 |
| 5,121,494 | 6/1992 | Dias et al. | 395/600 |
| 5,121,495 | 6/1992 | Nemes | 395/600 |
| 5,287,499 | 2/1994 | Nemes | 395/600 |
| 5,335,345 | 8/1994 | Frieder et al. | 395/600 |
| 5,390,359 | 2/1995 | Damerau | 395/800 |
| 5,473,607 | 12/1995 | Hausman et al. | 370/85.13 |

OTHER PUBLICATIONS

K. Salem et al., "Probabilistic Diagnosis of Hot Spots," Eighth International Conference on Data Engineering, Feb. 3–7, 1992, Tempe, Arizona, pp. 30–39.

B. H. Bloom, "Space/Time Trade-offs in Hash Coding with Allowable Errors," Communications of the ACM, vol. 13, No. 7, Jul. 1970, pp. 422–426.

K. Salem, "Space–Efficient Hot Spot Estimation," pp. 1–20, 1994.

S. Wei et al., "Hot–Spot Based Composition Algorithm," Eighth International Conference on Data Engineering, Feb. 3–7, 1992, Tempe, Arizona, pp. 48–55.

D. Gawlick, "Processing 'Hot Spots' in High Performance Systems," IEEE, 1985, pp. 249–251.

M. M. Astrahan et al., "Approximating the Number of Unique Values of an Attributer Without Sorting," Information Systems, vol. 12, No. 1, 1987, pp. 11–15.

A. Batson, "The Organization of Symbol Tables," Communications of the ACM, vol. 8, No. 2, Feb. 1965, pp. 111–112.

Primary Examiner—Thomas G. Black
Assistant Examiner—Hosain T. Alam
Attorney, Agent, or Firm—Baker, Maxham, Jester & Meador

[57] ABSTRACT

A data base management system estimates the number of occurrences of values of query search keys in a data set by defining at least two independent hashing functions that map the values of the data set to buckets of respective hashing tables and maintaining a bucket count as each value from the data set is mapped to the hashing tables. A bucket is defined to be a "popular" bucket if the bucket count of the value exceeds a predetermined threshold. If all of the buckets to which a value is mapped are designated popular buckets, that value is designated an "active" value. Once a value is designated active, statistical data related to the value is collected. Estimates of the most frequently occurring values in the data set are generated from the collected statistical data. In this way, a data base management system can more effectively produce a search plan that provides an efficient response to user queries.

73 Claims, 7 Drawing Sheets

METHOD AND APPARATUS FOR ESTIMATING THE NUMBER OF OCCURRENCES OF FREQUENT VALUES IN A DATA SET

BACKGROUND OF THE INVENTION

1. Field of the Invention

This invention relates generally to relational data base management systems with query optimizers and, more particularly, to identifying values that occur frequently within data sets for use in generating query plans.

2. Description of the Related Art

A computer system data base contains information represented as values of data that typically are grouped as attributes of tuples in relational tables and are stored on a storage media, such as magnetic disks. A data base management system provides an interface for a user to access the information. In particular, a data base management system accepts a user query and retrieves information from the data base according to the specifications of the query. For example, in a data base having employee data, a user might wish to retrieve the names and addresses of all employees whose job title is "programmer". It is possible to formulate relatively complicated queries that might require cross-referencing multiple tables or groupings of data in the data base. For example, a user might wish to retrieve the names of all employees whose job title is "programmer", whose work site is "New York", that received a pay bonus in the last year, and whose tenure with the company is greater than five years. To respond to such a query, it might be necessary to perform table join operations and access an employee location table, employee pay table, and employee history table.

Even in the case of relatively simple queries, such as finding all employees whose job title is "programmer", it is helpful for a data base manager to know something about the size of the answer set before the information is actually retrieved from data storage. For example, it would be helpful to know the approximate size of the answer set so the appropriate memory allocations can be made. In the case of relatively complicated queries, the order in which data tables are accessed can have a significant affect on the response time, depending on the distribution of values in the data set. For example, a query might necessitate searching each of two data fields for a particular desired instance of a value in each field. If the desired instance has a high occurrence in one field but not in the other, then it is more efficient to first search the field of lower occurrence. This provides a lower number of records that must subsequently be searched.

To ensure that an efficient plan for responding to a query is implemented, including such details as the proper memory allocation and the order of searching, a data base management system includes a query optimizer that generates a search plan according to a set of optimization rules that consider size of the answer set and the frequency of occurrences. To implement the optimization rules and determine the frequency of occurrences in a data set, it is possible to scan each instance of each value and to create a frequency distribution of all the data values.

Scanning the data set can require multiple passes through the data set, which is exceedingly time consuming and is itself inefficient. In addition, scanning consumes valuable resources such as memory space and processor time, adding to the inefficiency. In general, inefficiency in the scanning approach is minimized if the data set values are uniformly distributed. For example, the query optimizer can be somewhat efficient with the scanning approach if the query concerns the age of employees and if the ages are stored within the data set in an ordered sequence from youngest to oldest, if the ages are uniformly distributed, and if the total size of the data set is known. Similar advantages can accrue if the query concerns the names of employees and if the employees are stored in alphabetical order, the names are uniformly distributed across the alphabet, and the total size is known. Scanning is generally unacceptable because, as might be expected, most data sets do not include uniformly distributed data. Rather, most occurrences of data values are highly skewed and therefore scanning on one field provides little or no benefit to the query optimizer on the other fields.

The paper "Probabilistic Diagnosis of Hot Spots" by K. Salem, et al., in Proceedings of the 1992 Data Engineering Conference at pages 30–39, describes techniques that can be used to identify frequently occurring values in a data set. Although the paper is directed to the problem of identifying data items that are more frequently accessed than others for memory buffer management techniques, it can be applied to identifying frequently occurring values for query optimizers. That is, the number of times an item is accessed can be assumed relevant to the number of times an item occurs and therefore the number of times it will be accessed in response to a query.

More particularly, the Salem paper describes using multiple functions that randomly map data values to counters. An independent mapping function is used to map each value to a counter. For each mapping function, a "hot" counter will be a counter with a count that exceeds a threshold value. A value that is mapped to a hot counter for every mapping function is reported as a frequent value. The mapping functions are also known as hashing functions and the counters are also known as hashing table entries. As with the scanning approach described above, for this scheme it is necessary to accumulate frequency statistics according to every occurrence of data items of interest.

Rather than scanning all values of a data set and generating a frequency distribution, it is possible to sample values from the data set and extrapolate a frequency distribution. Such frequency estimators are not as slow and wasteful of memory space as scanning approaches. Sampling frequency estimators eliminate the need for scanning every field of every record and therefore are not as slow, wasteful of memory space, or distribution dependent as the scanning approaches. Typical estimation methods, however, can be sensitive to the distribution of data values and also to the arrival distribution of the data values.

From the discussion above, it should be apparent that there is a need for a system that identifies values in a data set that occur more frequently than other values and estimates the number of times the frequently occurring values appear in the data, which permits a query optimizer to generate a query plan of improved efficiency, with improved accuracy and efficiency. The present invention satisfies this need.

SUMMARY OF THE INVENTION

In accordance with the invention, the most frequently occurring values in a data set of a digital computer are identified by defining at least two independent hashing functions that map the values of the data set to buckets of respective hashing tables and maintaining a bucket count as each data set value is mapped. As the values are mapped, a bucket is designated a "popular" bucket within its hash table if the bucket count meets predetermined popularity criteria.

At the same time, a data set value is designated "active" if all of the buckets to which the value is mapped have been designated popular buckets. After a value is designated active, statistical data related to that value is collected as data set values continue to be mapped to the hashing tables and subsequent instances of the active value are encountered. After all of the data set values have been mapped, frequency estimates of the active values are generated from the collected statistical data. Values are designated most frequent according to predetermined frequency criteria. A query optimizer of a data base management system can use the designated frequent values and the frequency estimates to more effectively produce a search plan that provides an efficient response to user queries.

In one aspect of the invention, the popularity criteria for designating a bucket of a hashing table as a popular bucket can comprise, for example, selecting the P highest bucket counts of the table. Preferably, the P value is the same for all hashing tables. The statistical data collected on active values preferably includes a count of the occurrences of all active values subsequent to their becoming active. The frequent value criteria for identifying the most frequently occurring values can comprise, for example, selecting the F highest frequency estimates of the active value occurrences. It has been found that best results are obtained when P is greater than F by a factor of two or three. If desired, the frequency parameter F and popularity parameter P can be provided in an interactive manner from a terminal user.

In another aspect of the invention, different active value frequency estimators can be used that provide reliable data over a variety of data sets, including sets that have uniform or skewed value distributions and arrival distributions. The estimates can be generated, for example, according to a Constant Rate estimator that utilizes the count of a value designated active and assumes the occurrence frequency of a value after being designated active is also the occurrence frequency of the value before being designated active. Another estimator that can be used in accordance with the invention is a Bucket Rate estimator that assumes the contribution of a value to a bucket count is the same before and after activation. Thus, any change in the bucket count rate since activation is assumed to be due to a change in the arrival rate of the active value. Yet another estimator that can be used is an active rate estimator that considers the contribution of a value to a bucket count since activation to estimate the contribution of the other values to the bucket since activation and the contribution of the value to the bucket count before activation. The estimate of the other value bucket count contribution after activation is extrapolated to estimate the bucket count before activation using the constant rate estimator. Finally, a bucket values estimator can be used that estimates the number of distinct values in buckets at the time of activation and estimates the average number of occurrences of each value from the number of estimated values in each bucket. Other estimators will occur to those skilled in the art. Any single estimator or combination of estimators can be used to produce the desired occurrence frequency estimate. The estimator to be used can be selected, if desired, in accordance with known or expected value frequency and arrival characteristics of the data set.

Other features and advantages of the present invention should be apparent from the following description of the preferred embodiment, which illustrates, by way of example, the principles of the invention.

DESCRIPTION OF THE PREFERRED EMBODIMENT

Figure 1:
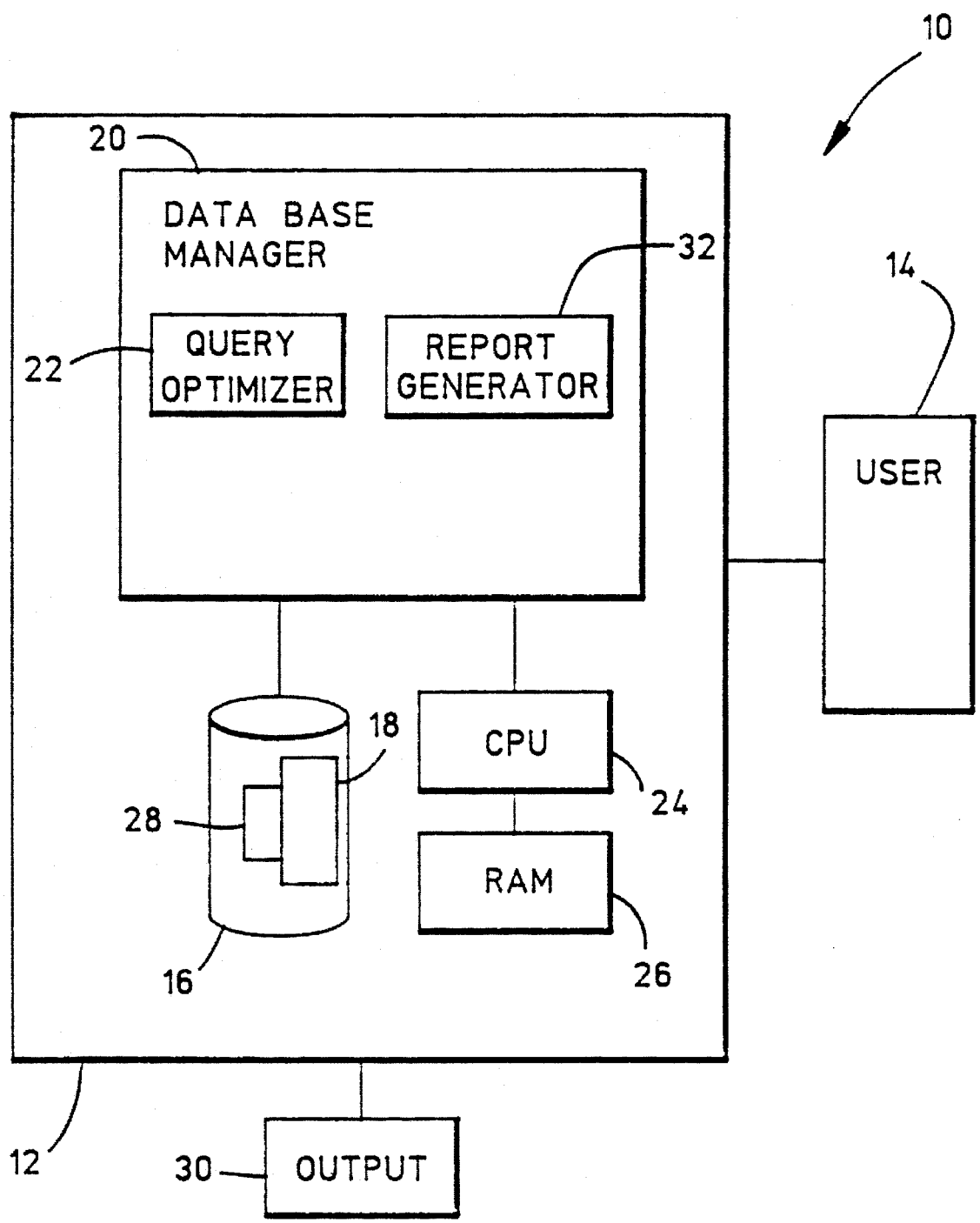
FIG. 1 is a block diagram of a computer system constructed in accordance with the present invention.

FIG. 1 shows a computing system 10, constructed in accordance with the present invention, that includes a processor unit 12 with which a user 14 communicates. The processor unit communicates with one or more direct access storage devices 16 containing a data base 18 and includes a data base manager 20 that receives queries for data base searches from the user 14. A query optimizer 22 of the data base manager formulates a search plan to scan the data base in response to a user query. The data base manager identifies the most frequently occurring values in the data base 18 to thereby permit the query optimizer to generate a more efficient search plan. In accordance with the present invention, the most frequently occurring values are identified by mapping the data base values to hashing tables, determining the most popular buckets to which values are collectively hashed, designating active values comprising values that are mapped only to popular buckets, and collecting frequency statistics for the active values. In this way, statistics on only the most frequently occurring values need be kept and relatively accurate estimates of the most frequent values can be generated. The query optimizer 22 uses the designated frequent values to more effectively produce a search plan that provides an efficient response to user queries.

The processor unit 12 can comprise, for example, a personal computer such as the International Business Machines Corporation ("IBM") "PS/2" personal computer, or can be a workstation such as the IBM "RS6000" workstation, or can be a mini-computer, such as the IBM "AS400" computer. Alternatively, the processor can be a mainframe unit such as an IBM "Model 370" or "Model 390", and the user 14 can comprise a user terminal attached to the mainframe or to a mainframe network. The processor unit 12 operates under control of a central processor unit (CPU) 24. Those skilled in the art will appreciate that the construction of the CPU will depend on the particular processor unit selected. The direct access storage device(s) 16 can comprise, for example, a hard disk drive of a personal computer or a multiple-cylinder disk drive of a mainframe unit. The hashing tables and active value frequency statistics are maintained by the data base manager 20 and can be stored temporarily in data storage of the computer comprising either the storage device 16 or a high-speed working memory 26, such as random access memory (RAM), of the processor unit 24.

The data base 18 stored in the storage device(s) 16 comprises, for example, a set of relational data values typically represented as data tables. Associated with the data tables are table descriptors 28 that specify table structure, size, type, and the like, including a list of frequently occurring values previously computed by the methods described herein. The table descriptors are used by the data base manager 20 when it accesses the data base and retrieves data values. The data base manager controls the retrieval of data values responsive to a user query and delivery of them back to the user 14 or to an output device 30, such as a printer. The data base manager can include a report generator 32 that provides the identified frequent values and associated statistics to the query optimizer 22 or to the user 14. Alternatively, the frequently occurring value information can be associated with the table descriptors of the data base and access given during query analysis by the optimizer.

Figure 2:
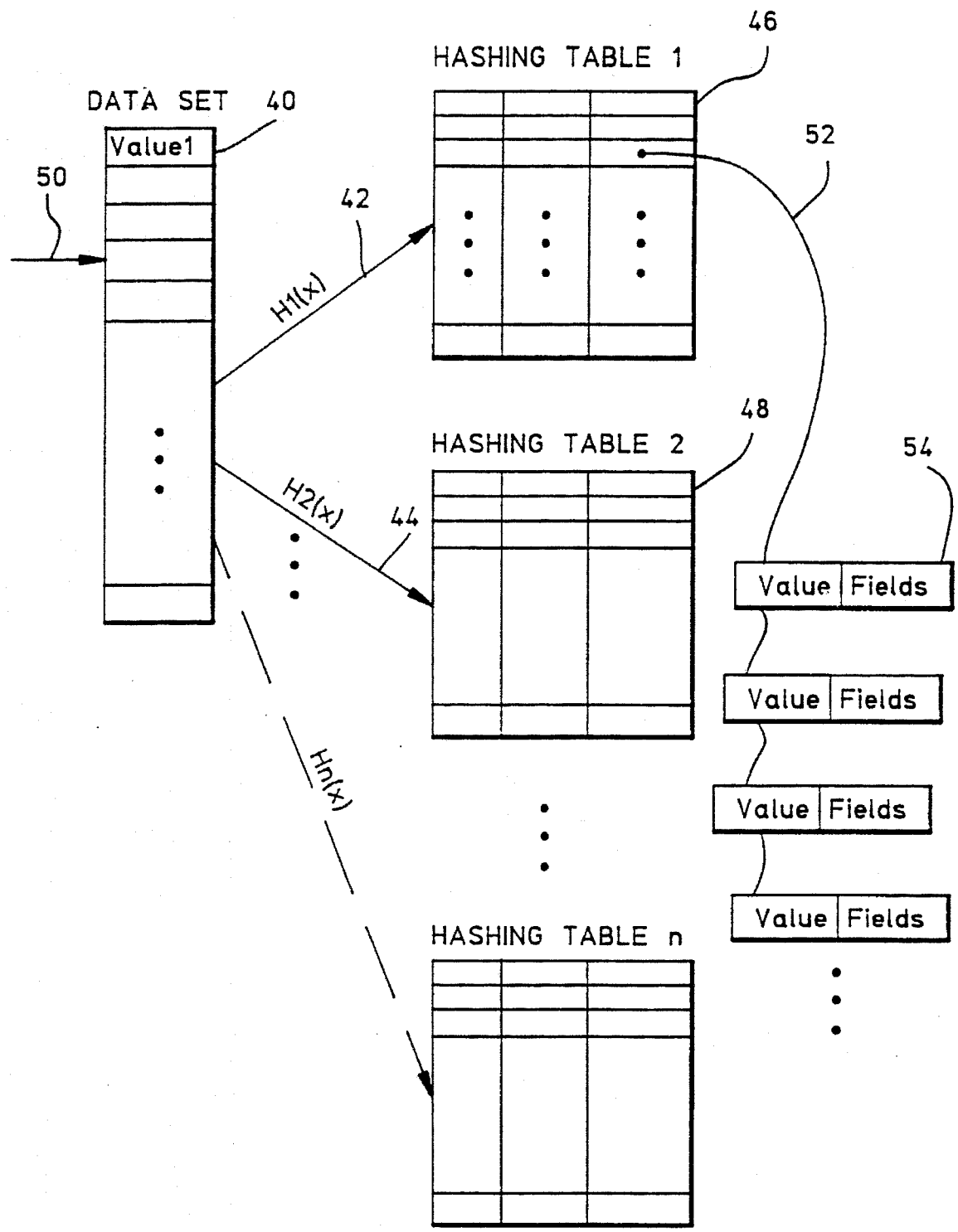
FIG. 2 is a data flow representation of the system for determining frequent values illustrated in FIG. 1.

FIG. 2 shows how the data values are mapped to hashing tables. Only one set of data values from the data base 18 is illustrated in FIG. 2 for purposes of illustration, but it is to be understood that the data base potentially contains many different sets of data values and that each set contains relational values having many fields. The illustrated data set 40 is represented as an array of values. The data set can be organized into tables that include columns corresponding to the data fields and containing data such as employee names, addresses, job titles, job sites, and employment tenure. An entire row of the table is commonly referred to as a data record. To respond to some user queries, it might be necessary to perform table join operations on multiple tables to access additional data fields.

To map the data set values to hashing tables, the data base manager 20 defines at least two independent hashing functions that are represented in FIG. 2 by the arrows marked H1(x) 42 and H2(x) 44, respectively, where x represents a data set value. The hashing tables to which the values are mapped by H1(x) and H2(x) are represented by an H1 table 46 and an H2 table 48. If desired, more than two hashing functions can be used. All of the hashing functions are independent, meaning that there should be no correlation between the values produced by the hashing functions. A separate hashing table will be provided for each hashing function.

Those skilled in the art will recognize that hashing functions are functions that compute a hashing table row address, or bucket, as a function of a value that typically is a search key of a record. For example, in the exemplary data set above that contains employee data, a rudimentary function for hashing employee names to a table with five buckets might compute a bucket number according to the first letter of an employee's last name. The computation carried out by the data base manager 20 might involve representing the ith letter of the alphabet by the integer i and mapping the integer according to a function (i, modulo 5) to a bucket. Thus, last names beginning with A would be mapped by the data base manager to the first bucket and those beginning with B to the second bucket. Names beginning with the sixth letter, F, would be mapped to the first bucket, those beginning with G would be mapped to the second bucket, and so forth.

Another hashing function for a five-bucket table might use a frequency distribution of letters occurring in the English language to map the first letter i of a name (i, modulo 5) to a bucket. Thus, last names beginning with the generally recognized most frequent letter, E, would be mapped by the data base manager 20 to the first bucket, those beginning with R would be mapped to the second bucket, and so forth. Other exemplary hashing functions having varying numbers of buckets will occur to those skilled in the art.

As the data base manager 20 maps the values in the data set 40 one by one to the hashing tables 46 and 48, it increments a hashing count each time it maps a value to one of the multiplicity of buckets. The data base manager also maintains a data pointer 50 that indicates the value being mapped by the hashing functions. Each hashing table consists of a vector, or array, of buckets. Each bucket address references a bucket count field that contains the count of values that have been mapped to the bucket, a flag indicating whether the bucket has been designated a popular bucket of the hash table, and a vector link to the values for that bucket that have been designated active values. The vector link is maintained by the data base manager 20 and is represented in FIG. 2 by a sequence of links 52 to active values records 54. In the preferred embodiment, only one of the hash tables maintains a vector link to the active values. This is because active values are designated active across all hashing tables and therefore any active value can be identified and retrieved from any one hashing table vector link. That is, additional links to identical active values are redundant beyond the first link. Each active value record includes active statistic fields, described further below, that include occurrence count data for a value beginning when the value is first designated active.

A bucket in one of the hashing tables 46, 48 is designated popular according to a predetermined popularity criterion. In the preferred embodiment, the popularity criterion comprises a number P that selects the buckets with the P greatest hashing counts as the popular buckets and is the same for all buckets. For example, if a hashing table has thirty buckets and P=8, then the eight buckets in each table with the greatest hashing counts are designated popular buckets. In the preferred embodiment, all of the hashing tables have the same number of buckets and the same popularity criterion is applied to the buckets of all the tables. Other popularity criteria schemes, however, will occur to those skilled in the art. For example, different hashing tables could be associated with different P-values, or P could represent a minimum count value above which a bucket is designated popular.

Figure 3:
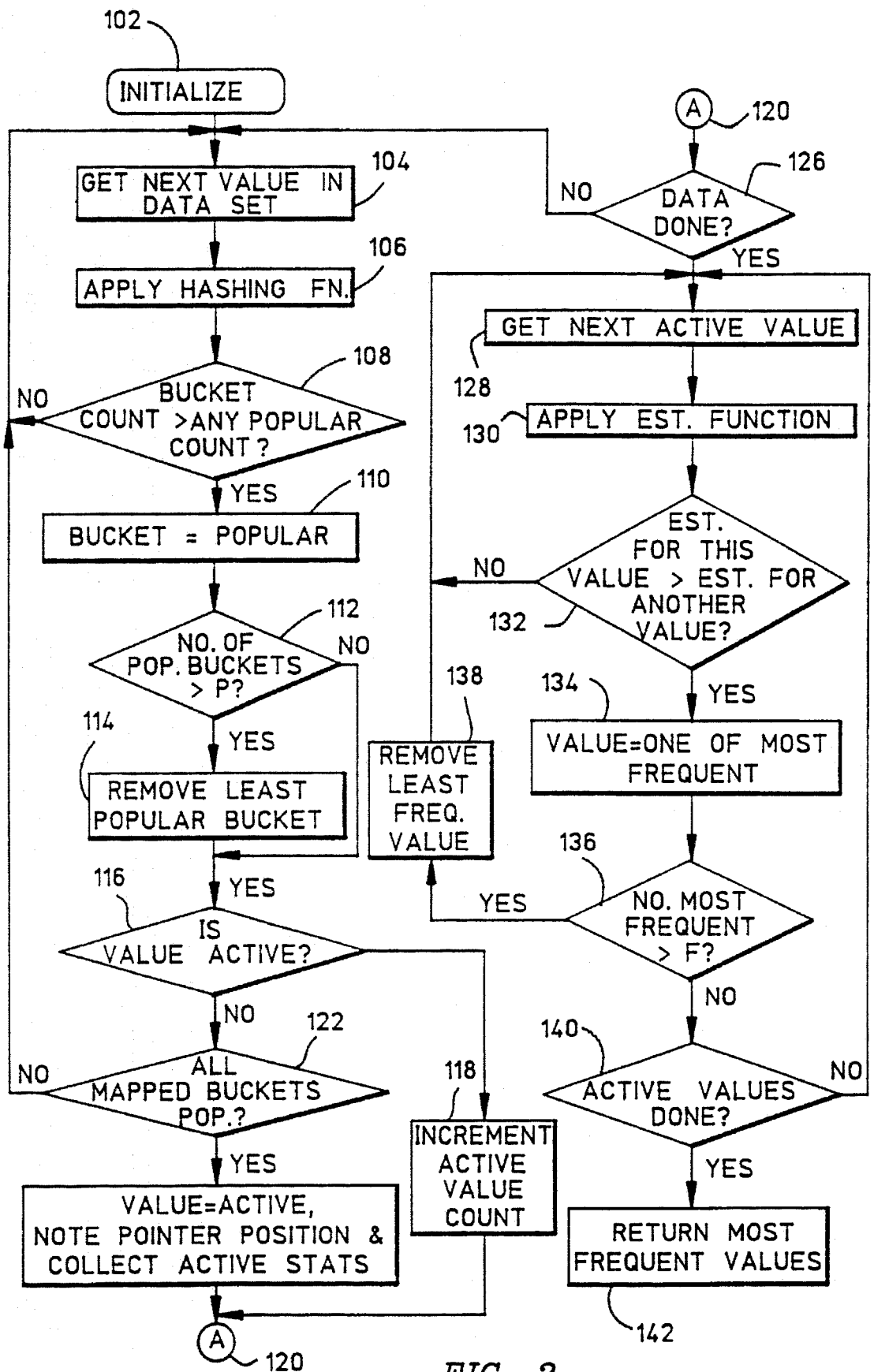
FIG. 3 is a flow diagram of the processing steps carried out in generating estimates of the number of occurrences of frequent values in the data set of the system illustrated in FIG. 1.

The operation of the data base management system 20 of the preferred embodiment will be better understood with reference to the flow diagram of FIG. 3, which illustrates the processing steps carried out in processing a data set and generating the estimates of the frequently occurring values in the data set. The first flow diagram box numbered 102 indicates that initialization of variables is the first step to be completed by the data base manager. Such steps include initializing counters and setting flags, the details of which depend on the particular implementation and can be easily completed by those skilled in the art in view of this description. Next, values are read from the data set to be processed, one after another, as indicated by the flow diagram box numbered 104. This step involves incrementing a data pointer to cycle through the data set.

Next, at the flow diagram box numbered 106, the data base manager applies each of the independent hashing functions to the data set value. As noted above, applying the hashing function produces a bucket address to each hashing table, whereupon the appropriate bucket count is incremented. The decision box numbered 108 indicates that the data base manager next checks to determine if the bucket count at each hashing table is greater than any bucket count of a bucket designated as "popular" at that table. If the bucket count is not greater, then the bucket does not meet the criteria for a popular bucket and processing returns to obtain the next data value at the flow diagram box numbered 104.

If the bucket count is greater than the bucket count for a popular bucket, then at the flow diagram box numbered 110, the data base manager designates the bucket to which the current data set value was mapped as a popular bucket. Next, at the decision box numbered 112, the data base manager checks to determine if the number of popular buckets is greater than the popularity parameter P. If the number of buckets that have been designated popular is greater than the popularity parameter P, then at the flow diagram box numbered 114 the data base manager removes the bucket with the lowest bucket count from the list of popular buckets. That is, in the hashing tables 46 and 48, the popularity flag of the corresponding lowest-count popular bucket is changed from popular to not popular. If the number of popular buckets did not exceed the popularity parameter P with the addition of the bucket newly designated as popular, then this last step is skipped and processing proceeds from the decision box numbered 112 directly to the next decision box numbered 116.

At the decision box numbered 116, the data base manager determines if the data set value currently being mapped has been designated an active value. If the value is an active value, then a value occurrence count is incremented at the flow diagram box numbered 118. Processing then continues at the connector box A numbered 120. If the value being mapped was not designated active, then at the decision box numbered 122, the data base manager checks to determine if all of the buckets to which this value is mapped have been designated popular buckets. If all of the mapped buckets are not popular, then processing continues with the next data set value at the flow diagram box numbered 104. If all of the mapped buckets are popular buckets, then at the flow diagram box numbered 124, the data base manager designates the current data set value as an active value and creates a value record with a link, as depicted in FIG. 2. The data base manager also stores data into the active fields of the active value records 54, including initializing the active value count to one, initializing a count of values mapped since this value was designated active, and noting the input pointer position in the input stream. Additional information describing the state of the popular buckets of the value at the time of its activation is also initialized in the active value record. For example, the count of input values already processed (the activation time) and the bucket count of the associated value buckets can be stored. The exact set of data stored in the value record will depend on the estimator selected, as described further below. Processing then continues at the connector A numbered 120.

Processing after the connector 120 begins with the decision box numbered 126, at which the data base manager checks to determine if all of the values from the data set have been scanned. If scanning the values has not been completed, then processing returns to obtaining the next data value at the flow diagram box numbered 104. If all of the data set values have been scanned, then processing of the collected active value statistics can begin with the flow diagram box numbered 128, at which the first active value is obtained. No particular processing sequence is required. The active value records can be processed, for example, in order of pointer position at time of activation. An estimating function is applied to the active value at the flow diagram box numbered 130. As described further below, any one of a number of estimating functions can be used. The estimating function can utilize various system statistics and active value statistics collected during the scanning of the data set.

At the decision box numbered 132, the data base manager checks to determine if the estimator value for the data value is greater than the estimator value for any other, already processed, active value. If the value is not greater, then processing can proceed with the next active value at the flow diagram box numbered 128. If the estimator is greater than another estimator, then at the flow diagram box numbered 134 the current active value being processed is designated one of the most frequent values. This can be implemented, for example, by setting a flag in one of the active value fields. Next, at the decision box numbered 136, the data base manager checks to determine if the number of active values designated most frequent is greater than the frequency parameter F.

At the decision box numbered 136, if the number of designated frequent values is greater than F, then the data base manager removes the already processed active value with the lowest frequency estimator value at the flow diagram box numbered 138. Processing then returns to the flow diagram box numbered 128, where the next active value is obtained. If the number of most frequent values is not exceeded, a negative outcome at the decision box 136, then the data base manager next checks to determine if all of the active value records have been processed at the decision box numbered 140. If there are active value records yet to be processed, then processing returns to the flow diagram box numbered 128, where the next active value is obtained.

If all of the active value records have been processed, then the estimator process is completed and the F most frequent values, as determined by the estimator, are returned at the flow diagram box numbered 142. The values can be returned by the report generator to the query optimizer and, if desired, can also be returned to the user. When the query optimizer 22 (FIG. 1) receives the frequent values estimates, it generates a query plan that is used to efficiently retrieve data from the storage 16 and return it to the user via the output device 30. Thus, the data base manager 20 oversees a process that receives a query, estimates a frequency distribution of data elements in the data base that is the subject of the query, formulates a query plan based on the frequency estimates, and then extracts data that satisfies the query from the data base and returns the data to an output device.

As noted above, different active value frequency estimators can be used. FIGS. 4, 5, 6, and 7 illustrate four exemplary estimators that have been used with satisfactory results. It is to be understood, however, that those skilled in the art may provide other estimators that are more ideally suited to particular sets of data Values. The estimators described in FIGS. 4–7 are provided for purposes of illustration.

Figure 4:
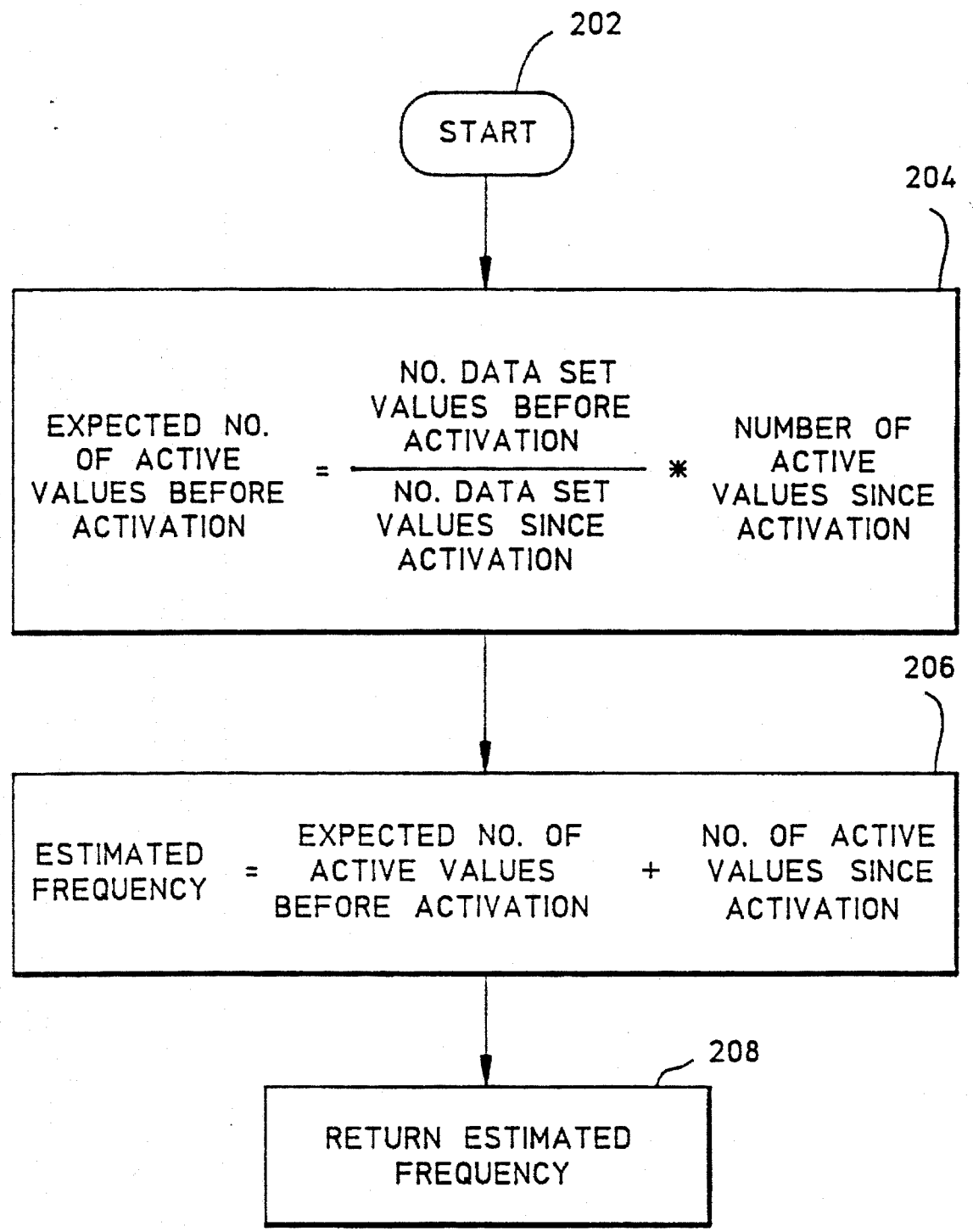
FIG. 4 is a flow diagram of the processing steps carried out by a constant rate estimator of the system illustrated in FIG. 1.

FIG. 4 represents the processing steps for what may be referred to as a Constant Rate estimator that utilizes the count of a value designated active and assumes the occurrence frequency of a value after being designated active is also the occurrence frequency of the value before being designated active.

The Constant Rate estimator flow chart begins at the start box numbered 202 and proceeds with a calculation in which the number of data set values processed from the input stream before activation is divided by the number of data set values processed from the time of activation to the end of the input stream, as indicated by the flow diagram box numbered 204. This quotient is multiplied by the number of active values counted since activation. This product is equal to the expected number of active values occurring before activation. In the next flow diagram box numbered 206, the expected number of active values before activation obtained from the prior box 204 is added with the number of active values counted since activation, a number that is counted by the estimator process, as described above in connection with the flow diagram of FIG. 3, This product provides the estimated frequency for the activated value, which is returned at the flow diagram box numbered 208.

Figure 5:
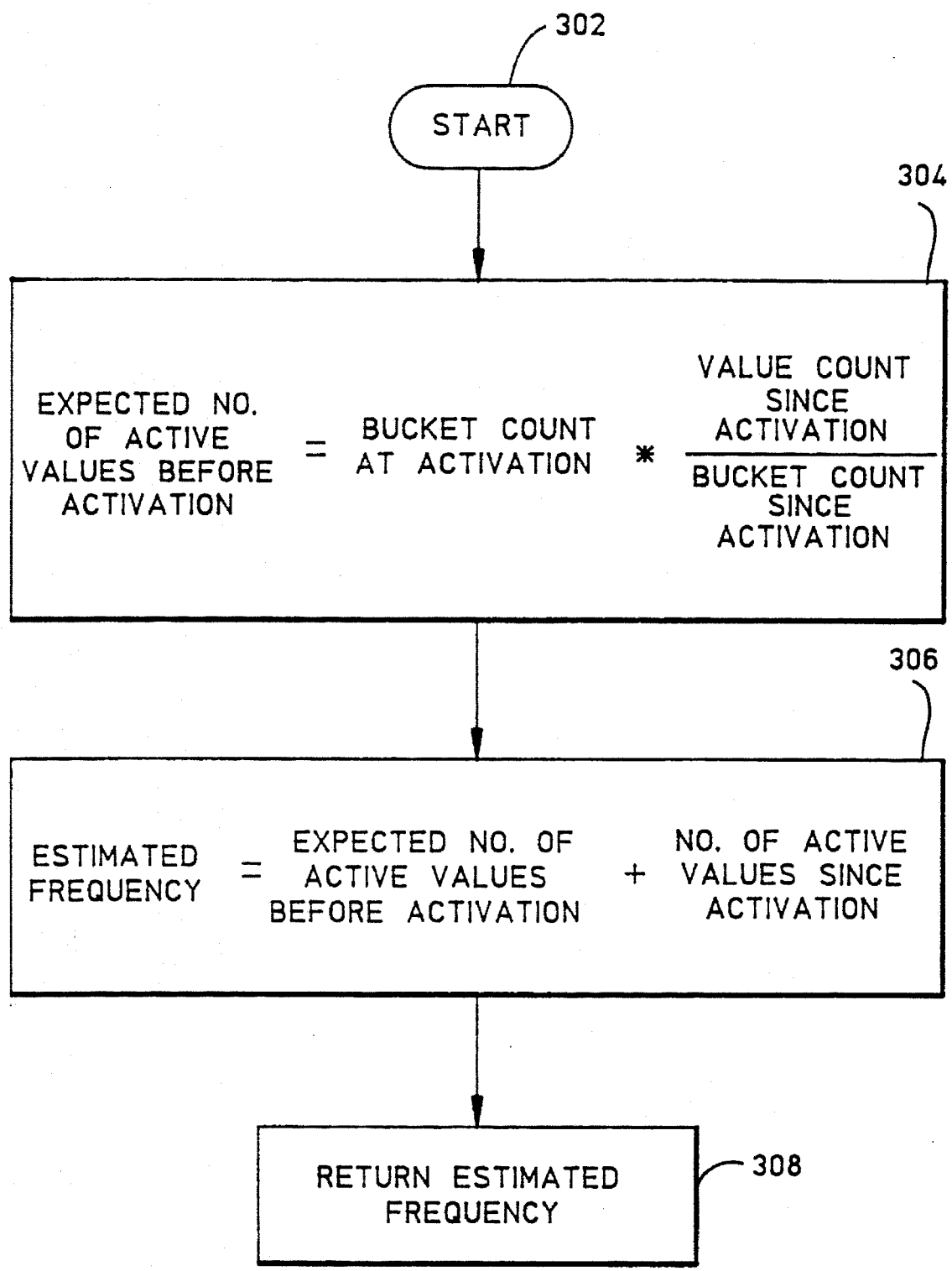
FIG. 5 is a flow diagram of the processing steps carried out by a bucket rate estimator of the system illustrated in FIG. 1.

FIG. 5 illustrates the processing steps for what may be referred to as a Bucket Rate estimator, which assumes the contribution of a value to a bucket count is the same before and after activation. In FIG. 5, it is to be understood that the processing steps after the start box numbered 302 can be repeated for each hashing table, if desired, but that only one value is selected as the value to be returned. One of the tables can be selected for return, an average estimated frequency value can be returned, or some other selection scheme decided upon after experimentation can be selected. Any one of such schemes can be selected with satisfactory results.

In the first processing step numbered 304, a quotient is obtained by dividing the value count since activation by the bucket count since activation. This quotient is multiplied by the bucket count at the time of activation to provide the expected number of active values before activation. At the flow diagram box numbered 206, this expected number of active values before activation is added to the number of active values counted since activation to provide the estimated frequency for the active value in question. The estimated frequency is then returned at the next flow diagram box numbered 308.

Figure 6:
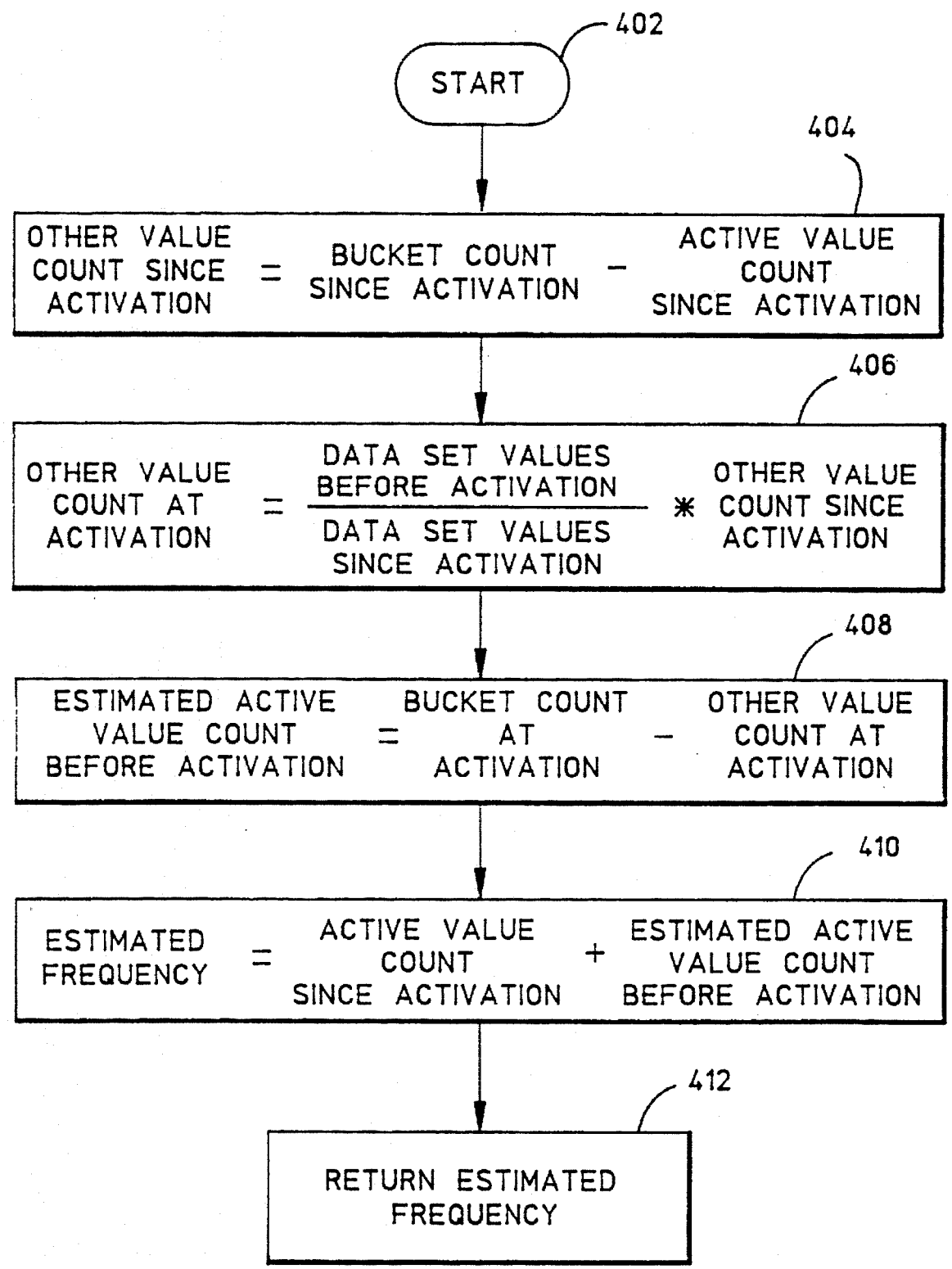
FIG. 6 is a flow diagram of the processing steps carried out by an active rate estimator of the system illustrated in FIG. 1.

FIG. 6 represents the processing steps for what may be referred to as an Active Rate estimator, which uses the contribution of values other than the active value whose frequency is being estimated. In particular, the contribution of other values to the bucket count since the time of activation is used to estimate the active value's portion of the bucket count before activation. As with the Bucket Rate estimator, it should be understood that a single estimator value is returned, although an estimator can be calculated for each hashing table and one of the estimates can be selected for return.

Processing begins at the flow diagram box numbered 402 and proceeds with the first calculation at box 404, at which the active value count since activation is subtracted from the bucket count since activation to provide what is identified as the other value count since activation. In the next flow diagram box numbered 406, this other value count is multiplied by the quotient of the number of data set values counted before activation divided by the number of data set values counted since activation. The product from the flow diagram box numbered 406 provides what is called the other value count at the time of activation. In the next flow diagram box numbered 408, the other value count is subtracted from the bucket count at activation to provide an estimated active value count before activation. This value count is then added to the active value count since activation in the next flow diagram box numbered 410. This sum provides the estimated frequency, which is returned at the next flow diagram box numbered 412.

Figure 7:
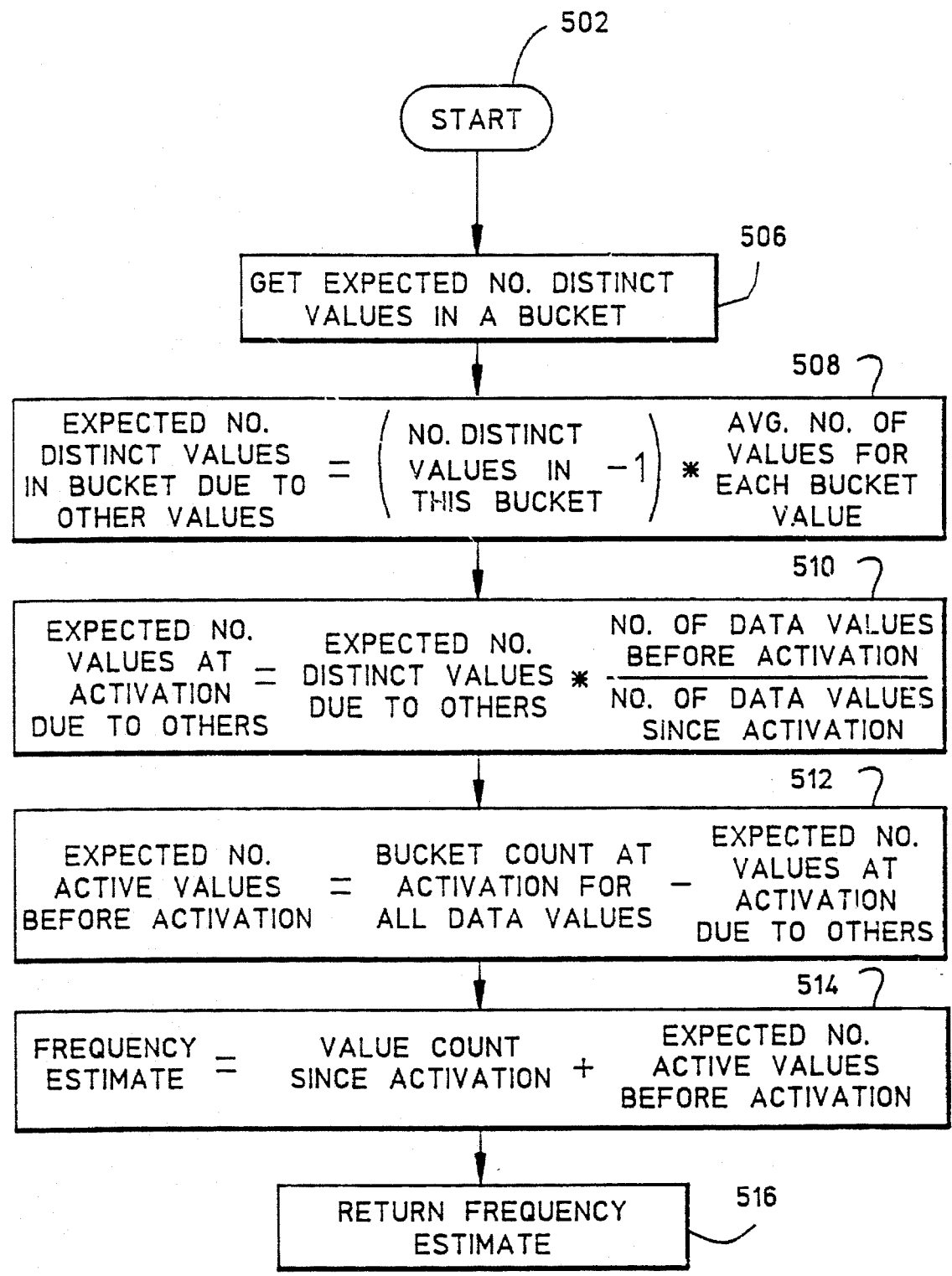
FIG. 7 is a flow diagram of the processing steps carried out by a frequent value estimator of the system illustrated in FIG. 1.

Finally, FIG. 7 represents the processing steps for the last exemplary frequency rate estimator, which may be referred to as a Bucket Values estimator. This estimator uses a distinct values function that estimates the number of distinct values mapped to a bucket. Such functions are known to those skilled in the art and need no further explanation. As with the previous two estimators that used bucket data, it is to be understood that the processing steps of the flow chart can be repeated for each hashing table, if desired, and one result is selected to be returned as the active value occurrence estimate.

The first step after the start box 502 is numbered 506 and obtains the expected number of distinct values in a bucket. Next, in the flow diagram box numbered 508, the distinct values in a bucket is reduced by one to provide the number of distinct values attributable to values other than the value whose frequency is being estimated. This number is then multiplied by the average number of values for each distinct value, which was calculated in the processing described in FIG. 3. This product provides the expected number of distinct values in the bucket due to the other values. In the next flow diagram box numbered 510, this number is multiplied by the quotient of the number of data values before activation divided by the number of data values since activation. The product from box 510 provides the expected number of values at activation due to the other values. In the next flow diagram box numbered 512, this expected number of values is subtracted from the bucket count at activation for all data values. The result of the subtraction provides the expected number of active values before activation. This number is then added to the value count since activation in the flow diagram box numbered 514 to provide the frequency estimate. The frequency estimate is then returned in the flow diagram box numbered 516.

The processing of the frequent values estimator according to the system illustrated in FIG. 1 will be further understood with reference to the following pseudocode. In the pseudocode, the frequent values estimator is referred to as a function called Function Process_Input having a parameter list of an Input, which comprises a set of data values, a frequency number called NumFreq, the hashing frequency parameter F called HashSize, and the popularity parameter P called NumPopular. The pseudocode for the estimator function follows:

```
Function Process_Input (Input, NumFreq, HashSize, NumPopular)
//Working Variables
Bucket = variable type for each hashing function that consists of:
        Values =            data set elements mapped to this bucket
        Counter =           number of data set elements hashing to this bucket
        DistinctBits = estimated number of distinct elements mapped to this bucket
Value = variable type that consists of:
        Value =             a particular data set element
        ValueCount =        count of elements since the Value was designated Active
        WhenActivated =     input pointer position when the Value was activated
        MyBuckets = buckets to which this active Value is mapped
        BucketCounts =      estimate of distinct values in the buckets when this Value
                            was activated
        BucketDistinct =    estimated number of distinct values in buckets to which this
                            Value is mapped
HashTable = variable type for each hashing function that consists of:
```

```
    HashFunction(x) =       the hash function that maps value x to this table
    DistinctHash(x) =       the function that estimates the DistinctBits in bucket x
    Buckets =               the set of buckets comprising this table
    PopularBuckets =        the set of buckets in this table that are designated popular
InputStream = set of data set elements
InputPosition = pointer position to a data set element from the InputStream
//Initializations
InputPosition = 0
FOR HashTable1 and HashTable2:
    Set all Buckets.Counter = 0
    Set all Buckets.DistinctBits = 0
    Set all Buckets.Values = empty
    Set all PopularBuckets = empty
//Process the data values
FOR each record in InputStream:
    Value = next(InputStream)
    Bucket1 = HashTable1.HashFunction1(Value)
    Bucket1.Counter ++
    Bucket2 = HashTable2.HashFunction2(Value)
    Bucket2.Counter ++
    //Determination of popular buckets
    Pop1 = FALSE
    Pop2 = FALSE
    If (Bucket1.Counter is in HashTable1.PopularBuckets) then
            Pop1 = TRUE
    else    if (Bucket1.Counter > any bucket count in HashTable1.PopularBuckets) then
                    add Bucket1 to HashTable1.PopularBuckets
            if (size(HashTable1.PopularBuckets) > NumPopular) then
                    remove bucket with smallest count from
HashTable1.PopularBuckets
            Pop1 = TRUE
    If (bucket2.Counter is in HashTable2.PopularBuckets) then
            Pop2 = TRUE
    else    if (Bucket2.Counter > any bucket count in HashTable2.PopularBuckets) then
                    add bucket2 to HashTable2.PopularBuckets
            if (size(HashTable2.PopularBuckets) > NumPopular) then
                    remove bucket with smallest count from
HashTable2.PopularBuckets
            Pop2 = TRUE
    //Determination of active values
    If (Value in Bucket1.Values) then
            ValueCount ++
    else if (Pop1 & Pop2) = TRUE then
            aValue = New (Value)
            aValue.Value = Value
            aValue.ValueCount = 1
            aValue.WhenActivated = InputPosition
            aValue.MyBuckets = {bucket1, bucket2}
            aValue.BucketCounts = {bucket1.Counter, bucket2.Counter}
            aValue.BucketDistinct =
                {estimateDistinct(bucket1.DistinctBits, bucket1.Counter),
                estimateDistinct(bucket2.DistinctBits, bucket2.Counter)}
            add aValue to Bucket1.Values
    Bucket1.DistinctBits = Bucket1.DistinctBits | HashTable1.DistinctHash(Value)
    Bucket2.DistinctBits = Bucket2.DistinctBits | HashTable2.DistinctHash(Value)
    InputPosition ++
//Input stream has been cycled through--now get estimate
freqValues = Estimate(HashTable1, NumFreq, InputPosition)
Function Estimate(HashTable, NumFreq, InputSize)
//freqValues is the set of {Values, number}
freqValues = empty
FOR each Value in Buckets.Values
    Estimate = estMethod (Value, InputSize)
    if (Estimate > all freqValues.number) then
            add {Values.Value, Estimate} to freqValues
            if (size(freqValues) > NumFreq) then
                    remove {Value, Number} with smallest number from freqValues
    Return (freqValues)
```

The first part of the pseudocode contains a definition of various working variables used in the process. Several variable types are defined, which include relational variables Bucket, Value, and HashTable. The first variable type comprises Bucket, which includes Bucket.Values, which is the set of data elements that are mapped to the particular bucket; Bucket.Counter, which is the bucket count of the values mapped to the particular bucket; and Bucket.DistinctBits, which is a function that provides the estimated number of distinct elements mapped to this bucket. Those skilled in the art will appreciate that any one of a number of well-known distinct element estimating functions can be used. A distinct bits estimating function as described, for example, in the IBM Research Report No. RJ4960 dated Dec. 30, 1985, called "Counting Unique Values of an Attribute Without Sorting," by Morton M. Astrahan of the IBM Research Laboratory at San Jose, California and Mario Schkolnick and Qyu-Young Wang at the IBM Thomas J. Watson Research Center in Yorktown Heights, New York.

Another variable type used in the estimator function is called Value, and includes Value.Value, a particular value from the data set; Value.ValueCount, a count of the number of values processed since the Value.Value was designated active; Value.WhenActivated, the input pointer position when the Value.Value was activated; Value.MyBuckets, the buckets to which this active value is mapped; Value.BucketCounts, an estimate of the distinct values in the buckets of Value.MyBuckets when this value was activated; and Value.BucketDistinct, the estimated number of buckets to which this active value is mapped.

The variable type HashTable includes HashTable.HashFunction, the hash function that maps a particular data set value to this hash table; HashTable.DistinctHash, the function that estimates the number of distinct bits (Bucket.DistinctBits) in a bucket; HashTable.Buckets, the set of buckets comprising this hash table; and HashTable.PopularBuckets, the set of buckets in this hashing table that are designated popular.

The next part of the pseudocode includes the initialization steps illustrated in the FIG. 3 flow chart as the first step 102. As illustrated in the pseudocode, the initializations include setting the data pointer position to zero, and setting all of the Buckets variables and PopularBucket variables to initial values for each of the hashing tables and hashing functions. After the initialization step, the input values are processed, one by one. Thus, for each input record in the data values, the variable Value is set equal to the next element from the InputStream. The next line of the pseudocode indicates that a bucket address for the first hashing table is determined by applying the first hash function to the data set Value. The next line of the pseudocode indicates that the bucket count for this bucket of the first hashing table is incremented. Similarly, the next two lines of the pseudocode indicate that the second hashing function is applied to the Value. If additional independent were included, then they likewise would be applied to the current Value from the data set.

Next, the popular buckets are determined. A popularity flag for each hashing table is initially set to a value FALSE, as indicated by the next lines of pseudocode relating to the values Pop1 and Pop2. For each one of the hashing tables, the popularity flag for the currently mapped bucket is set to a TRUE value if the corresponding bucket count Bucket.Counter is among a list of popular buckets for the current hashing table, designated HashTable.PopularBuckets. If the bucket has not been designated a popular bucket, then the process next checks to determine if the Bucket.Counter value is greater than any bucket count in the list of popular buckets for this hashing function. If it is, then this bucket is added to the list of popular buckets. Next, after the currently mapped bucket has been added to the list of popular buckets, the process checks to determine if the number of buckets that have been designated popular is greater than the popularity parameter P, which sets a limit on the number of buckets that can be designated popular. If the popularity parameter P has been exceeded, then the process removes the bucket with the smallest count from the list of popular buckets for this hashing table. The popularity parameter for this hashing table (Pop1) is then set to a TRUE value. The same processing is carried out for the second hashing function at the second hashing table. If more than two independent hashing functions are provided, then similar processing is carried out for each one of the remaining hashing functions and their respective hashing tables.

The active values are next determined. In the first line of pseudocode for this section of the processing, the Value is first checked to determine if it already has been designated an active value and therefore is in the list of active values called Bucket.Values. If it is, then the active value count Value.ValueCount for this value is incremented. If the currently mapped Value was not previously designated an active value, the processing then checks to determine if all of the popularity flags from above were given a TRUE value. If all are TRUE, then all of the buckets to which the current Value is mapped are popular buckets. Thus, the currently mapped Value is designated an active value, as indicated in the pseudocode by "aValue". That is, variable type aValue includes the currently mapped Value in the relation aValue.Value. Because the Value is newly designated active, a series of initialization steps follows. These include initializing the value count of values mapped since the Value was designated active. Also, the relation Value, when activated is equal to the input pointer position at the time the Value was designated active. Next, the bucket addresses in order of hashing tables are stored in the relation Value. MyBuckets. Similarly, the corresponding bucket counts are stored in a relation Value.BucketCounts. Finally, the number of distinct values being mapped to each one of the buckets is stored in the relation Value.BucketDistinct according to the DistinctBits function described above. Finally, the Value is added to the relation Bucket1.Values to provide a link from the bucket of the first hashing table to the Value. As noted above, this link can be established for each one of the buckets in the hashing tables, but is redundant. Therefore, in the preferred embodiment, the links are established only to the first hashing table. Next, the bit map for estimating the number of distinct values in the bucket is updated. Finally, the input pointer is incremented so that the next data set value can be processed.

After all of the data set values have been mapped so that the input stream has been cycled through, the frequency estimates can be obtained. In the pseudocode, obtaining a frequency value estimate is represented as a call to a function called Estimate having the parameters of a hashing table (having links to the active values), the frequency parameter F, and the input pointer designating a particular active value.

The next portion of the pseudocode is the listing for the estimating function, which is called Function Estimate. In the estimating function, the variable FreqValues is initially set to an empty value. Next, a series of processing steps is carried out for each Value in the relation Buckets. Values, as follows. First, one of the frequency estimating functions is called, as represented by a function call to a function EstMethod, returning a value called Estimate. Next, if the Estimate value is greater than all of the FreqValues.Number relations, then the active value corresponding to this estimate is added to the set of FreqValues. Next, if the size of the FreqValues list is greater than the frequency parameter F, then the active value corresponding to the smallest returned Estimate value is removed. That is, the relation FreqValues contains the active values and corresponding statistics having the F highest returned Estimate values. The routine ends with the return of the FreqValues relation.

A further understanding of the operation steps followed in obtaining each of the four exemplary estimating function described above will be gained with reference to the following pseudocode for the functions:

```
//Estimation methods
//Constant Rate estimator: ConstantRateEstimator(Value, InputSize)
Return(Value.ValueCount*(1+(Value.WhenActivated/(InputSize –
Value.WhenActivated))))
//Bucket Rate estimator: BucketRateEstimator(Value, InputSize)
Return(Value.ValueCount *      (1 + (Value.BucketCounts[1] – (Value.MyBuckets[1] *
                               Counter – Value.BucketCounts[1]))))
//Active Rate estimator: ActiveRateEstimator(Value, InputSize)
Return(Value.ValueCount +      Value.BucketCounts[1] –
                               Value.WhenActivated/(InputSize – Value.WhenActivated))
//Bucket Values estimator: BucketValuesEstimator(Value, InputSize)
totalDistinct = scan buckets of HashTable(s) to estimate distinct input values using
                               the Bucket.DistinctBits
expectedPerValue = InputSize/totalDistinct
Others = Value.BucketDistinct[1] * expectedPerValue
Return(Value.ValueCount + Value.BucketCounts[1] – Others *
                               Value.WhenActivated/(InputSize – Value.WhenActivated))
END
```

In the pseudocode listed immediately above, the same variable definitions are used as for the pseudocode described previously for the estimating process. Four exemplary estimating functions were described above, comprising estimators that were given the names of a ConstantRate estimator, a Bucket Rate estimator, an Active Rate estimator, and a Bucket Rates estimator. Their respective pseudocode will be described in turn.

The pseudocode for the Constant Rate estimator comprises a single line. The pseudocode illustrates that the value of the input pointer when the value being estimated became active is subtracted from the data set input size. This difference provides the number of data values processed after the value became active. Next, the count of values when the value became active is divided by the number of values processed after the value became active. This quotient provides the estimated frequency for this value. The product of this quotient and the number of occurrences of this value since activation is assumed to be equal to the number of occurrences of this value before activation. That is, the rate of occurrence of this value before activation is assumed to be equal to the rate of occurrence of this value after activation. Thus, the total frequency estimate is the value count since activation plus the product above.

The Bucket Rate estimator, as represented in the pseudocode above, generates a frequency estimate for a particular active value based on the first hashing table. It is to be understood, however, that any one of the other hashing tables could be used in the calculations. In addition, those skilled in the art will recognize that other calculation schemes could be used. For example, the calculations could be carried out for each of the hashing tables and the frequency estimate could be set equal to the average estimated value, or the median, or some other selection criterion could be used.

Assuming the first hashing table is used, as in the exemplary pseudocode above, the Bucket Rate estimator first subtracts the bucket count (since activation) from the total number of data set values mapped to the bucket. This provides the number of data set values mapped to this bucket of the first hashing table that are attributable to the data set values other than the active value. In order of operations for the single line of pseudocode, the product of the difference and the number of buckets to which the active value was mapped is next obtained. This product is then subtracted from the bucket count since activation to provide the estimated values occurring for this bucket since activation. The product of this number and the active value count since activation added to the active value count then provides the total estimated number of active values occurring in this data set. This estimated number of values is returned as the estimator value.

The pseudocode for the Active Rate estimator, like the Bucket Rate estimator, assumes relevant bucket count data is obtained for the first hashing table. As noted above, however, other means of providing the relevant bucket count data may be followed. Particularly, the pseudocode shows that the bucket count data from the first hashing table is obtained and the number of counts in the bucket when activated is divided by the difference of the input size subtracted by the number of values processed when the value became active. This sum is added to the count of values since activation to provide the estimate.

The Bucket Values estimator first obtains estimates of the number of distinct values mapped to each of the buckets in a hash table. The expected number of values per bucket is then obtained from the quotient of input size divided by the total number of distinct values. An intermediate variable called Others is then obtained by multiplying the number of distinct values mapped to each bucket of the first hashing table multiplied by the expected number of values obtained in the prior line of pseudocode. The frequency estimate is then obtained by multiplying the variable Others by the quotient of the number of values processed at activation divided by the number of values processed before activation. This product is subtracted from the count of bucket values for the first hashing table. This difference is then added to the count of values since activation to provide the frequency estimate.

Thus, as described above, the present invention provides a means of identifying the most frequently occurring values in a data set, and estimating their frequency, by defining multiple independent hashing functions of the data set values to hashing tables. A predetermined popularity criterion is applied to identify buckets of the hashing table that quality as "popular" buckets. If all of the buckets to which a value is mapped are popular buckets, then that value is designated an "active" value. When a value is designated active, various occurrence statistics and counts are maintained for that value until the remainder of the data set is processed. After the values of the data set are mapped to the various hashing tables, estimating functions are used that take the occurrence statistics for active values since the time of activation and extrapolate occurrence counts for the active value before the time of activation. The total then represents the estimated frequency of occurrence for that active value in the data set. Such estimates can be obtained for all of the values designated active and the predetermined frequency parameter F can be used to select the most frequently occurring values. These estimates are especially useful to query optimizers of data base management systems for generating efficient search plans in response to user queries.

The present invention has been described above in terms of a presently preferred embodiment so that an understanding of the present invention can be conveyed. There are, however, many configurations for data base management systems and query optimizers not specifically described herein but with which the present invention is applicable. The present invention should therefore not be seen as limited to the particular embodiment described herein, but rather, it should be understood that the present invention has wide applicability with respect to data base management systems generally. All modifications, variations, or equivalent arrangements that are within the scope of the attached claims should therefore be considered to be within the scope of the invention.

We claim:

1. A method of estimating the number of occurrences of values of query search keys in a data set stored in a digital computer for use by a query optimizer of the computer, the method comprising the steps of:

defining at least two independent hashing functions that map values of the data set to buckets of respective hashing tables that are maintained in data storage of the computer;

obtaining a current value from among the values in the data set;

mapping the current value to a multiplicity of hashing table buckets of the data storage that are defined by each hashing function and incrementing an associated bucket count in the data storage;

determining if the incremented bucket count of each hashing table satisfies predetermined criteria for being a popular bucket;

designating the current value as active if all of the buckets to which the current value is mapped are designated popular buckets and adding the current value to a list of active values in the data storage that are associated with at least one of the hashing tables;

collecting predetermined, statistical data related to the current value if it has been designated active;

repeating the steps of obtaining, mapping, determining, and designating until all values in the data set have been obtained; and producing estimates of the most frequent values in the data set from the collected statistical data and providing them to the query optimizer.

2. A method as defined in claim 1, wherein the step of collecting statistical data includes the step of maintaining an active value count that is incremented for each currently mapped bucket of the active value.

3. A method as defined in claim 2, wherein the step of incrementing the active value count comprises the steps of:

incrementing the active value count if the value was previously designated an active value; and initializing the active value count and collecting predetermined statistics if the value was newly designated an active value.

4. A method as defined in claim 1, wherein the step of determining comprises the steps of:

designating a bucket as a popular bucket if the bucket count is one of the P highest bucket counts in the respective hashing table, where P is a predetermined popularity parameter; and removing the designation of a bucket as a popular bucket if the bucket count is the lowest among the popular buckets and the number of popular buckets is greater than the popularity parameter P.

5. A method as defined in claim 4, wherein the parameter P is provided by a computer user.

6. A method as defined in claim 4, wherein the popularity parameter P is the same for all hashing tables.

7. A method as defined in claim 1, wherein the step of producing estimates of frequent values comprises producing a predetermined number F of estimates, wherein F is a most frequent values estimator parameter.

8. A method as defined in claim 7, wherein the most frequent values parameter F is provided by a computer user.

9. A method as defined in claim 1, wherein the step of producing estimates of the most frequent values in the data set comprises the steps of:

generating a frequent value estimate for each active value; and selecting the F highest estimates, wherein F is a predetermined most frequent values estimator parameter.

10. A method as defined in claim 9, wherein the step of generating a frequent value estimate comprises selecting one estimator from a plurality of estimators in accordance with expected value distribution characteristics of the data set.

11. A method as defined in claim 9, wherein the step of generating a frequent value estimate comprises the steps of:

calculating a Constant Rate estimator defined by the product of the occurrences of an active value and the ratio of the count value when the value was first designated an active value and the time since the value was first designated an active value to generate the estimate for an active value;

repeating the step of calculating for each active value; and returning the F highest estimates for the active values.

12. A method as defined in claim 9, wherein the step of generating a frequent value estimate comprises the steps of:

calculating a Bucket Rate estimator defined by the sum of the occurrences of an active value and to generate the estimate for an active value;

repeating the step of calculating for each active value; and returning the F highest estimates for the active values.

13. A method as defined in claim 9, wherein the step of generating a frequent value estimate comprises the steps of:

calculating an Active Rate estimator defined by the number of occurrences of an active value added with the bucket count at the time the value was designated active subtracted by to generate the estimate for an active value;

repeating the step of calculating for each active value; and returning the F highest estimates for the active values.

14. A method as defined in claim 9, wherein the step of generating a frequent value estimate comprises the steps of:

calculating a Bucket Values estimator defined by the number of occurrences of an active value added with the bucket count at the time the value was designated active subtracted by the product of added with the product of to generate the estimate for an active value;

repeating the step of calculating for each active value; and returning the F highest estimates for the active values.

15. A method as defined in claim 14, wherein the number of values in a bucket is estimated by using a distinct input values estimator.

16. A method as defined in claim 14, wherein the average number of occurrences per value is estimated dividing the total number of values by an estimated number of distinct values obtained by using a distinct input values estimator.

17. A method of estimating the most frequently occurring values of query search keys in a data set located in data storage of a digital computer for use by a data base manager of the computer in retrieving values from the data storage in accordance with a user query, the method comprising the steps of:

(1) for each value in the data set, repeating the processing steps of
  (a) obtaining a data set value from among the values stored in the data storage,
  (b) mapping the value to a bucket in respective hashing tables of data storage that are defined by each of at least two independent hashing functions and incrementing an associated bucket count of each bucket in the data storage,
  (c) designating the bucket a popular bucket if the incremented bucket count is one of the P highest bucket counts in the respective hashing table, where P is a predetermined popularity parameter,
  (d) detecting if the number of buckets in the data storage that are designated popular buckets is greater than the popularity parameter P and removing the designation of a previously designated different bucket as a popular bucket if the bucket count of the different bucket is the lowest among the popular buckets,
  (e) designating the value an active value if all of the buckets to which the value is mapped have been designated popular buckets and adding the value to a list of active values in the data storage that is associated with at least one of the hashing tables,
  (f) collecting predetermined statistical data in the data storage relating to the value if it was designated an active value at the step of designating active values or if it was previously designated an active value,
until all values in the data set have been processed;

(2) producing an estimate of the F most frequent values in the data set using the collected statistical data after all values in the data set have been processed, where F is a predetermined frequency estimator parameter; and (3) providing the estimated most frequent values to the data base manager for use in generating a query plan to retrieve values in the data set and return the retrieved values to an output device.

18. A method as defined in claim 17, wherein the step of collecting statistical data includes incrementing an active value count for the buckets to which the active value is mapped.

19. A method as defined in claim 17, wherein the step of producing an estimate comprises the steps of:
  generating a frequent value estimate for each active value; and
  selecting the F highest frequent value estimates.

20. A method as defined in claim 19, wherein the step of generating a frequent value estimate comprises selecting one estimator from among a plurality of predetermined estimators in accordance with expected value distribution characteristics of the data set.

21. A method as defined in claim 17, wherein the frequency estimator parameter F is provided by a computer user.

22. A method as defined in claim 17, wherein the popularity parameter P is provided by a computer user.

23. A method as defined in claim 17, wherein the popularity parameter P is the same for all the hashing tables.

24. A method as defined in claim 17, wherein the step of generating a frequent value estimate comprises the steps of:
  calculating a Constant Rate estimator defined by the product of the occurrences of an active value and the ratio of the count value when the value was first designated an active value and the time since the value was first designated an active value to generate the estimate for an active value;
  repeating the step of calculating for each active value; and
  returning the F highest estimates for the active values.

25. A method as defined in claim 17, wherein the step of generating a frequent value estimate comprises the steps of:
  calculating a Bucket Rate estimator defined by the sum of the occurrences of an active value and the product of (the occurrences of an active value) and (the ratio of the bucket count at the time the value was designated active to the bucket count since the time the value was designated active) to generate the estimate for an active value;
  repeating the step of calculating for each active value; and
  returning the F highest estimates for the active values.

26. A method as defined in claim 17, wherein the step of generating a frequent value estimate comprises the steps of:
  calculating an Active Rate estimator defined by the number of occurrences of an active value added with the bucket count at the time the value was designated active subtracted by (the ratio of the number of occurrences of the value before it was designated active to the time since it was designated active) multiplied by (the bucket count at the time the value was designated active subtracted by the active value count) to generate the estimate for an active value;
  repeating the step of calculating for each active value; and
  returning the F highest estimates for the active values.

27. A method as defined in claim 17, wherein the step of generating a frequent value estimate comprises the steps of:
  calculating a Bucket Values estimator defined by the number of occurrences of an active value added with the bucket count at the time the value was designated active subtracted by the product of added with the product of to generate the estimate for an active value;
  repeating the step of calculating for each active value; and
  returning the F highest estimates for the active values.

28. A method as defined in claim 27, wherein the number of values in a bucket is estimated by a distinct input values estimator.

29. A method as defined in claim 27, wherein the average number of occurrences per value is estimated by dividing the total number of values by an estimated number of distinct values obtained from a distinct input values estimator.

30. A computer combination having a central processor unit, data storage having a data set of values, and a data base management system having a data base manager that operates on the data set to retrieve values of query search keys in accordance with a user query, the combination including:
  at least two independent hashing functions maintained by the data base manager in the data storage of the computer that map the values of the data set to buckets of respective hashing tables in the data storage and increment a bucket count associated with each bucket when the respective function maps a value to the bucket;
  a query optimizer that determines a query 7plan to be followed by the data base manager in response to the user query; and a frequent values estimator, wherein for each value of the data set the frequent values estimator:

determines if each bucket to which the value is mapped satisfies predetermined criteria for being a popular bucket, determines if the current value has been designated an active value, and maintains statistics on the value if it is active until all values of the data set have been mapped; and a report generator that determines the most frequent values in the data set and produces a report of the values to the query optimizer.

31. A combination as defined in claim 30, wherein the frequent values estimator determines if a bucket is a popular bucket by:

designating a bucket as a popular bucket if the bucket count is one of the P highest bucket counts in the respective hashing table, where P is a predetermined popularity parameter; and removing the designation of a bucket as a popular bucket if the bucket count is the lowest among the popular buckets and the number of popular buckets is greater than the popularity parameter P.

32. A combination as defined in claim 31, wherein the parameter P is provided by a computer user.

33. A combination as defined in claim 31, wherein the parameter P is the same for all hashing tables.

34. A combination as defined in claim 30, wherein the frequent values estimator maintains statistics in the data storage relating to active values by incrementing an active value count for all of the buckets to which an active value is mapped.

35. A combination as defined in claim 34, wherein the frequent values estimator increments an active value count for a value if the value was previously designated an active value and initializes the active value count if it newly designated the value as an active value.

36. A combination as defined in claim 34, wherein the report generator produces estimates of occurrences of the active values and selects a predetermined number F of the highest estimates, wherein F is a predetermined most frequent values estimator parameter.

37. A combination as defined in claim 36, wherein the most frequent values estimator parameter F is provided by a computer user.

38. A combination as defined in claim 30, wherein the report generator produces estimates of the most frequent values in the data set by:

generating a frequent value estimate for each active value; and selecting the F highest estimates, wherein F is a predetermined most frequent values estimator parameter.

39. A combination as defined in claim 38, wherein the report generator generates a frequent value estimate by selecting an estimator from among a plurality of predetermined estimators in accordance with expected value distribution characteristics of the data set.

40. A combination as defined in claim 39, wherein the selected estimator comprises a Constant Rate estimator such that the report generator generates a frequent value estimate by calculating the product of the occurrences of an active value and the ratio of the count value when the value was first designated an active value and the time since the value was first designated an active value to generate the estimate for an active value.

41. A combination as defined in claim 39, wherein the selected estimator comprises a Bucket Rate estimator such that the report generator generates a frequent value estimate by calculating the sum of the occurrences of an active value and the product of (the occurrences of an active value) and (the ratio of the bucket count at the time the value was designated active to the bucket count since the time the value was designated active) to generate the estimate for an active value.

42. A combination as defined in claim 39, wherein the selected estimator comprises an Active Rate estimator such that the report generator generates a frequent value estimate by calculating the number of occurrences of an active value added with the bucket count at the time the value was designated active subtracted by to generate the estimate for an active value.

43. A combination as defined in claim 39, wherein the selected estimator comprises a Bucket Values estimator such that the report generator generates a frequent value estimate by calculating the number of occurrences of an active value added with the bucket count at the time the value was designated active subtracted by the product of added with the product of to generate the estimate for an active value.

44. A combination as defined in claim 43, wherein the report generator includes a Distinct Input Values estimator that estimates the number of distinct values mapped to a bucket.

45. A combination as defined in claim 44, wherein the report generator estimates the average number of occurrences per value by dividing the total number of values by an estimated number of distinct values provided by the Distinct Input Values estimator.

46. A frequent values estimator system for use in a computer system having a central processor unit, data storage having a data set of values, and a data base management system having a data base manager that operates on the data set to retrieve values of query search keys in accordance with a user query, the system including:

at least two independent hashing functions, maintained by the data base manager in the data storage of the computer, that map the values of the data set to buckets of respective hashing tables in the data storage and, increment a bucket count associated with each bucket when a value is mapped to the bucket;

a query optimizer that determines a search plan to be followed by the data base manager in response to the user query;

a frequent values estimator, wherein for each value of the data set, the frequent values estimator:

determines if each bucket to which the value is mapped satisfies predetermined criteria for being a popular bucket, determines if the current value has been designated an active value, and maintains statistics in the data storage relating to the value, if it is active, until all remaining values of the data set have been mapped; and a report generator that determines the estimated most frequent values in the data set and provides the determined values to the query optimizer for use by the query optimizer in determining the search plan.

47. A system as defined in claim 46, wherein the report generator produces estimates of the most frequent values in the data set by:

generating a frequent value estimate for each active value; and selecting the F highest estimates, wherein F is a most frequent values estimator parameter.

48. A system as defined in claim 47, wherein the most frequent values estimator parameter F is provided by a computer user.

49. A system as defined in claim 47, wherein the popularity parameter P is the same for all hashing tables.

50. A system as defined in claim 47, wherein the popularity parameter P is provided by a computer user.

51. A system as defined in claim 47, wherein the report generator generates a frequent value estimate by selecting an estimator from among a plurality of predetermined estimators in accordance with expected value distribution characteristics of the data set.

52. A system as defined in claim 47, wherein the selected estimator comprises a Constant Rate estimator such that the report generator generates a frequent value estimate by calculating the product of the occurrences of an active value and the ratio of the count value when the value was first designated an active value and the time since the value was first designated an active value to generate the estimate for an active value.

53. A system as defined in claim 47, wherein the selected estimator comprises a Bucket Rate estimator such that the report generator generates a frequent value estimate by calculating the sum of the occurrences of an active value and the product of to generate the estimate for an active value.

54. A system as defined in claim 47, wherein the selected estimator comprises an Active Rate estimator such that the report generator generates a frequent value estimate by calculating the number of occurrences of an active value added with the bucket count at the time the value was designated active subtracted by (the ratio of the number of occurrences of the value before it was designated active to the time since it was designated active) multiplied by (the bucket count at the time the value was designated active subtracted by the active value count) to generate the estimate for an active value.

55. A system as defined in claim 47, wherein the selected estimator comprises a Bucket Values estimator such that the report generator generates a frequent value estimate by calculating the number of occurrences of an active value added with the bucket count at the time the value was designated active subtracted by the product of added with the product of to generate the estimate for an active value.

56. A system as defined in claim 55, wherein the report generator includes a distinct input values estimator that estimates the number of values in a bucket.

57. A system as defined in claim 56, wherein the report generator estimates the average number of occurrences per value by dividing the total number of values by an estimated number of distinct values provided by the distinct input values estimator.

58. A computer system comprising:
a computer terminal that receives commands from a terminal user;
a data storage unit that receives a data set having values of query search keys;
a data base management system having a data base manager that operates on the data set to retrieve values from among the values in the data storage unit in accordance with a user query and that maintains at least two independent hashing functions that map the values of the data set to buckets of respective hashing tables in the data storage unit and increment a bucket count of the data storage unit associated with each bucket when a value is mapped to the bucket;
query optimizer means for determining a query plan to be followed by the data base manager in response to the user query;
frequent values estimator means for determining, for each value of the data set, if each bucket to which the value is mapped satisfies predetermined criteria for being a popular bucket, determining if the current value has been designated an active value, and maintaining statistics on the value if it is active, until all values of the data set have been mapped; and
a report generator that determines the estimated most frequent values in the data set based on the statistics and produces a report of the values to the query optimizer means.

59. A computer system as defined in claim 58, wherein the frequent values estimator means determines if a bucket is a popular bucket by:
designating a bucket as a popular bucket if the bucket count is one of the P highest bucket counts in the respective hashing table, where P is a predetermined popularity parameter; and
removing the designation of a bucket as a popular bucket if the bucket count is the lowest among the popular buckets and the number of popular buckets is greater than the popularity parameter P.

60. A computer system as defined in claim 59, wherein the popularity parameter P is provided by a computer user.

61. A computer system as defined in claim 59, wherein the popularity parameter P is the same for all hashing tables.

62. A computer system as defined in claim 58, wherein the frequent values estimator means maintains statistics on active values by incrementing an active value count for all of the buckets to which an active value is mapped.

63. A computer system as defined in claim 62, wherein the frequent values estimator means increments an active value count for a value if the value was previously designated an active value and initializes the active value count if it newly designated the value as an active value.

64. A computer system as defined in claim 62, wherein the report generator produces estimates of occurrences of the active values and selects a predetermined number F of the highest estimates, wherein F is a predetermined most frequent values estimator parameter.

65. A computer system as defined in claim 64, wherein the most frequent values estimator means parameter F is provided by a computer user.

66. A computer system as defined in claim 58, wherein the report generator produces estimates of the most frequent values in the data set by:
generating a frequent value estimate for each active value; and
selecting the F highest estimates, wherein F is a predetermined most frequent values estimator parameter.

67. A computer system as defined in claim 66, wherein the report generator generates a frequent value estimate by selecting an estimator from among a plurality of predetermined estimators in accordance with expected value distribution characteristics of the data set.

68. A computer system as defined in claim 67, wherein the selected estimator comprises a Constant Rate estimator such that the report generator generates a frequent value estimate by calculating the product of the occurrences of an active value and the ratio of the count value when the value was first designated an active value and the time since the value was first designated an active value to generate the estimate for an active value.

69. A computer system as defined in claim 67, wherein the selected estimator comprises a Bucket Rate estimator such that the report generator generates a frequent value estimate by calculating the sum of the occurrences of an active value and the product of to generate the estimate for an active value.

70. A computer system as defined in claim 67, wherein the selected estimator comprises an Active Rate estimator such that the report generator generates a frequent value estimate by calculating the number of occurrences of an active value added with the bucket count at the time the value was designated active subtracted by (the ratio of the number of occurrences of the value before it was designated active to the time since it was designated active) multiplied by (the bucket count at the time the value was designated active subtracted by the active value count) to generate the estimate for an active value.

71. A computer system as defined in claim 67, wherein the selected estimator comprises a Bucket Values estimator such that the report generator generates a frequent value estimate by calculating the number of occurrences of an active value added with the bucket count at the time the value was designated active subtracted by the product of added with the product of to generate the estimate for an active value.

72. A computer system as defined in claim 71, wherein the report generator includes a distinct input values estimator that estimates the number of values in a bucket.

73. A computer system as defined in claim 71, wherein the report generator estimates the average number of occurrences per value by dividing the total number of values by an estimated number of distinct values provided by the distinct input values estimator.

* * * * *

UNITED STATES PATENT AND TRADEMARK OFFICE
CERTIFICATE OF CORRECTION

PATENT NO. : 5,542,089

DATED : July 30, 1996

INVENTOR(S) : Lindsay et al

It is certified that error appears in the above-identified patent and that said Letters Patent is hereby corrected as shown below:

Col. 18, line 41, insert --[the product of (the occurrences of an active value) and (the ratio of the bucket count at the time the value was designated active to the bucket count since the time the value was designated active)]--, between "and" and "to".

Col. 18, line 51, insert --[(the ratio of the number of occurrences of the value before it was designated active to the time since it was designated active) multiplied by (the bucket count at the time the value was designated active subtracted by the active value count)]--, between "by" and "to".

Col. 18, line 60, insert --[(the number of values in a bucket) and (the average number of distinct values) and (the ratio of the time before the value was designated active to the time since the value was designated active)]--, between "of" and "added".

Col. 18, line 61, insert --[(the average number of distinct values) and (the ratio of the time before the value was designated active to the time since the value was designated active)]--, between "of" and "to".

Col. 20, line 42, insert --[(the number of values in a bucket) and (the average number of distinct values) and (the ratio of the time before the value was designated active to the time since the value was designated active)]--, between "of" and "added".

UNITED STATES PATENT AND TRADEMARK OFFICE
CERTIFICATE OF CORRECTION

PATENT NO. : 5,542,089

DATED : July 30, 1996

INVENTOR(S) : Lindsay et al

It is certified that error appears in the above-identified patent and that said Letters Patent is hereby corrected as shown below:

Col. 20, line 43, insert --[(the average number of distinct values) and (the ratio of the time before the value was designated active to the time since the value was designated active)]--, between "of" and "to".

Col. 22, line 13, insert --[(the ratio of the number of occurrences of the value before it was designated active to the time since it was designated active) multiplied by (the bucket count at the time the value was designated active subtracted by the active value count)]--, between "by" and "to".

Col. 22, line 20, insert --[(the number of values in a bucket) and (the average number of distinct values) and (the ratio of the time before the value was designated active to the time since the value was designated active)]--, between "of" and "added".

Col. 22, line 21, insert --[(the average number of distinct values) and (the ratio of the time before the value was designated active to the time since the value was designated active)]--, between "of" and "to".

Col. 23, line 24, insert --[(the occurrences of an active value) and (the ratio of the bucket count at the time the value was designated active to the bucket count since the time the value was designated active)]--, between "of" and "to".

UNITED STATES PATENT AND TRADEMARK OFFICE
CERTIFICATE OF CORRECTION

PATENT NO. : 5,542,089

DATED : July 30, 1996

INVENTOR(S) : Lindsay et al

It is certified that error appears in the above-identified patent and that said Letters Patent is hereby corrected as shown below:

Col. 23, line 40, insert --[(the number of values in a bucket) and (the average number of distinct values) and (the ratio of the time before the value was designated active to the time since the value was designated active)]--, between "of" and "added".

Col. 23, line 41, insert --[(the average number of distinct values) and (the ratio of the time before the value was designated active to the time since the value was designated active)]--, between "of" and "to".

Col. 26, line 4, insert --(the number of values in a bucket) and the average number of distinct values) and (the ratio of the time before the value was designated active to the time since the value was designated active)]--, between "of" and "added".

UNITED STATES PATENT AND TRADEMARK OFFICE
CERTIFICATE OF CORRECTION

PATENT NO. : 5,542,089

DATED : July 30, 1996

INVENTOR(S) : Lindsay et al

It is certified that error appears in the above-identified patent and that said Letters Patent is hereby corrected as shown below:

Col. 26, line 5, insert --[(the average number of distinct values) and (the ratio of the time before the value was designated active to the time since the value was designated active)]--, between "of" and "to".

Signed and Sealed this

Eighth Day of April, 1997

Attest:

BRUCE LEHMAN

*Attesting Officer*            *Commissioner of Patents and Trademarks*